Feb. 26, 1929.
H. N. WOOD
1,703,807
MINING MACHINE
Filed Jan. 27, 1925
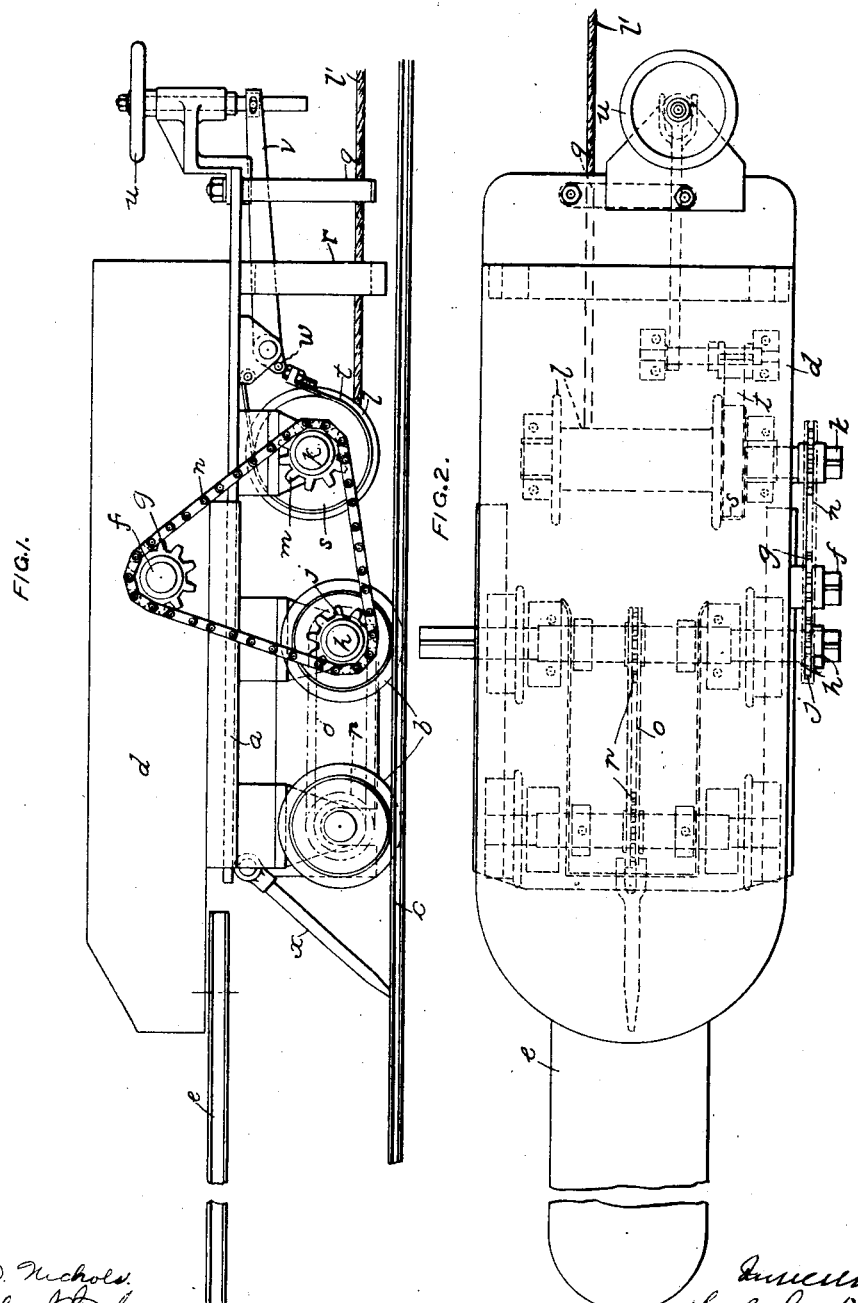

Patented Feb. 26, 1929.

1,703,807

UNITED STATES PATENT OFFICE.

HUGH NICHOLAS WOOD, OF NEWCASTLE-UPON-TYNE, ENGLAND, ASSIGNOR TO THE JEFFREY MANUFACTURING COMPANY, OF COLUMBUS, OHIO, A CORPORATION OF OHIO.

MINING MACHINE.

Application filed January 27, 1925, Serial No. 5,092, and in Great Britain April 7, 1924.

This invention comprises improvements in and connected with mining machines and is concerned particularly with machines in which the coal cutting mechanism is permanently mounted upon and is operated from a locomotive truck or tram, the propulsion being normally effected through chain and sprocket gearing between a motor and the wheels of the truck. However, these machines have been fitted with winding drums which have been applied for hauling the truck at a slow speed, as when moving out of a cutting place or ascending a steep gradient, the haulage cable being secured to an anchor jack and the truck propelled by winding on the cable. In making provision for the propulsion of a mining machine carriage truck by the simultaneous driving of the wheels and winding on of a haulage cable, it is important to have a minimum amount of gearing and it is also important to arrange for the sprocket chains to be jockeyed so that when slack they cannot wrap around the sprockets or ride on to the teeth thereof.

The principal object of the present invention is to provide a coal cutting machine adapted for satisfying all the requirements indicated in the preceding paragraph whilst at the same time involving no complicated or expensive gearing.

According to this invention, the axes of a driving sprocket, a track wheels axle sprocket and a winding drum sprocket are arranged at points of a triangle on the framing of the truck of a coal cutting machine, and a single sprocket chain is passed around all three sprockets so that the drive of the motor is transmitted by the one chain to both the winding drum and the axle of the track wheels. With this arrangement, the sprocket of the winding drum may be said to act as a jockey pulley for keeping the chain from sagging on to the sprocket of the track wheels axle. A suitable arrangement is one in which the triangle aforesaid is almost equilateral, the driving sprocket being at the apex, the track wheels axle sprocket being at one base angle and the winding drum sprocket at the other base angle, the base rising slightly on account of the wheels axle being at a slightly lower level than the winding drum carried beneath the truck frame. Other dispositions of the axles and sprockets may be adopted, however, provided that they permit of attaining a similar effect to that above described.

It is apparent that the winding drum may be fitted with a clutch so that it can be clutched to and declutched from its shaft. Also, a brake drum may be formed integrally with or attached to the winding drum so that a brake band under control of a hand wheel on the rear of the truck may be applied when the machine is descending a gradient. However, where a worm drive is associated with the motor so that the truck wheels cannot overrun the motor, such brake may be unnecessary.

In order to enable the invention to be readily understood, reference is made to the accompanying drawing, illustrating one suitable construction and arrangement of parts in accordance with these improvements, in which drawing:—

Figure 1 is a side elevation of a locomotive mining machine in which the three sprockets are arranged at points of a triangle and geared by a single sprocket chain, and Figure 2 is a plan of Figure 1.

In the drawing, $a$ is the frame of a truck or tram having track wheels $b$ running on a track $c$, the said frame supporting a coal cutter mechanism comprising a motor and gearing in a casing $d$ and a cutter jib $e$. On a lateral prolongation of a shaft $f$ driven by the motor, and externally of the casing $d$, a sprocket $g$ is fixed, this being the driving sprocket. On a prolongation of the axle $h$ of the rear track wheels there is fixed a sprocket $j$ and on a prolongation of a spindle $k$ of a winding drum $l$ there is fixed a sprocket $m$. As will be seen from Figure 1, the centres of the sprockets $g$ $j$ $m$ are situated at points of a triangle which is almost an equilateral triangle, the sprocket $j$ being situated somewhat forwardly of the sprocket $g$ and at a slightly lower level than the sprocket $m$ on account of the winding drum $l$ mounted beneath the frame $a$ being of necessity at a higher level than the track wheels $b$. A sprocket chain $n$ is passed around all three sprockets $g$ $j$ $m$, so that when the motor drives the sprocket $g$, the chain will transmit the drive simultaneously to the winding drum $l$ and the track wheels $b$.

The leading track wheels are preferably geared with the rear track wheels by means of chain and sprocket gearing $o$ $p$ situated along the centre line of the truck. The haulage cable may be taken from the winding drum $l$ and be passed around cable guide pins $q$ depending from the rear of the frame $a$, the said cable being then led and fastened to an appropriately situated anchor. Depending struts $r$ may also be fitted to the frame $a$, these struts being designed to come into contact with the track rails in the event of the machine tilting rearwardly about the rear wheels axle $h$.

The winding drum $l$ is shown with a brake drum $s$ at one end, a brake band $t$ passed around this drum being under the control of a hand wheel $u$ on the rear of the frame $a$. The turning of the hand wheel $u$ lowers the long lever arm $v$ which effects the raising of the short lever arm $w$ and the tightening of the brake band $t$, as will be readily understood. If desired, the drum $l$ may be placed under the control of a clutch, so that for normal purposes it could remain declutched and not be driven by the sprocket chain $n$. $x$ is a known prop or strut provided on machines of this class.

The diameter of the winding drum $l$ and the size of the cable wound thereon are advantageously chosen so that the rate of wind due to revolution of the drum $l$ is about the same as the rate of travel due to the drive of the wheels $b$ on the track $c$. Thus in operation, a cable $l'$ is taken from the drum $l$ to an anchorage and the haulage of the rope mainly effects propulsion of the machine on a steep gradient or elsewhere, as when the machine may be working against a heavy load. But such propulsion is assisted by the track wheels which are simultaneously driven by the sprocket gearing. For normal running, the cable is not used but is coiled up on the drum 1, the propulsion being then effected solely by the driving of the track wheels $b$.

It will be readily understood from Figure 1 how that the arrangement described not only results in the drum $l$ being driven simultaneously with the track wheels $b$ but further results in the chain being jockeyed, as it were, by the sprocket $m$ so that any fouling of the chain $n$ on the sprocket $j$ is impossible.

What I claim is:—

1. In an apparatus of the class described, the combination with a truck having a frame, an axle journaled beneath the frame, traction wheels fixed to the axle and adapted to be supported by and travel along a track, a machine adapted to be supported upon the truck for transportation along the track said machine including power devices, a winding drum mounted upon the truck frame, a flexible draft device windable upon the drum adapted to be attached to a suitable anchor in advance of the truck, a sprocket wheel fixed to the axle, a sprocket wheel fixed to the winding drum, a sprocket wheel upon said machine connected with said power devices, and an endless chain engaging all of said sprocket wheels to simultaneously actuate said traction wheels and said winding drum and thereby propel said truck along said track.

2. In an apparatus of the class described, the combination with a truck having a frame, an axle journaled beneath the frame, traction wheels fixed to the axle and adapted to be supported by and travel along a track, a machine adapted to be supported upon the truck for transportation along the track said machine including power devices, a winding drum mounted upon the truck, a flexible draft device windable upon the drum and adapted to be attached to a suitable anchor in advance of the truck, a sprocket wheel fixed to the axle, a sprocket wheel fixed to the winding drum, a sprocket wheel upon the machine connected with said power devices, an endless chain engaging all of said sprocket wheels to simultaneously actuate said traction wheels and said winding drum and thereby propel said truck along said track, and brake mechanism adapted to retard movement of said chain and thereby retard movement of said truck along the track.

3. In an apparatus of the class described, the combination with a truck having a frame, an axle journaled beneath said frame, traction wheels fixed to said axle and adapted to be supported by and travel along a track, a machine adapted to be supported upon the truck for transportation along the track, said machine including power devices, a winding drum mounted upon said truck longitudinally removed from said axle, a flexible draft device windable upon said drum and adapted to be attached to a suitable anchor in advance of the truck, a sprocket wheel fixed to the axle, a sprocket wheel fixed to said drum, a sprocket wheel upon said machine above the level of the before mentioned sprocket wheels, and an endless chain engaging all of said sprocket wheels to simultaneously actuate said traction wheels and said winding drum and thereby propel said truck along said track.

4. In an apparatus of the class described, the combination with a truck having a frame, an axle journaled beneath said frame, traction wheels fixed to said axle and adapted to be supported by and travel along a track, a machine adapted to be supported upon the truck for transportation along the track said machine including power devices, a winding drum mounted in journal bearings beneath the truck frame longitudinally removed from the axle, a flexible draft device windable upon the drum and adapted to be attached to a suitable anchor in advance of the truck, a sprocket wheel fixed to the axle, a sprocket wheel fixed to the winding drum, a sprocket wheel upon the machine above the before mentioned sprocket wheels and connected with the power devices, and an endless chain engaging all of said sprocket wheels to simultaneously actuate said traction wheels and said winding drum and thereby propel said truck along said track.

5. In an apparatus of the class described, a wheeled truck, a drive sprocket in fixed connection with a wheel of said truck, a winding drum supported by said truck, a sprocket in fixed connection with said drum, a power driven shaft on said truck, a sprocket on said shaft, and an endless chain engaging said three sprockets.

6. In an apparatus of the class described, a wheeled truck, a drive sprocket in fixed connection with a wheel of said truck, a winding drum supported by said truck, a sprocket in fixed connection with said drum, a power driven shaft on said truck, a sprocket on said shaft, said three sprockets being disposed in triangular relation, and an endless chain engaging the three sprockets.

HUGH NICHOLAS WOOD.